June 18, 1963 J. S. CERRA 3,094,030
APPARATUS FOR CUTTING FILAMENTARY MATERIALS
Filed March 31, 1960 2 Sheets-Sheet 1
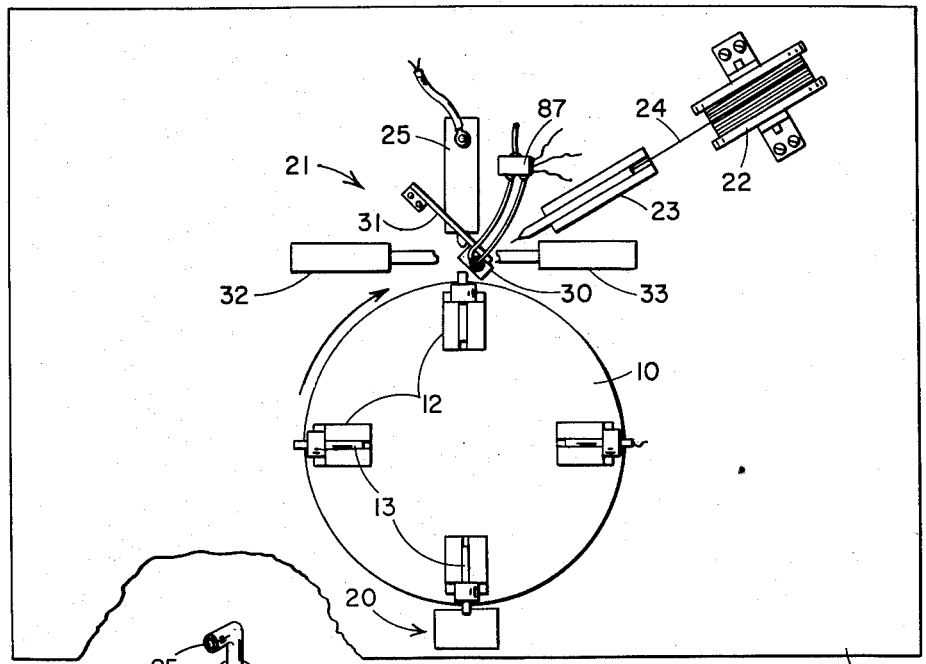
FIG. 1
FIG. 1A
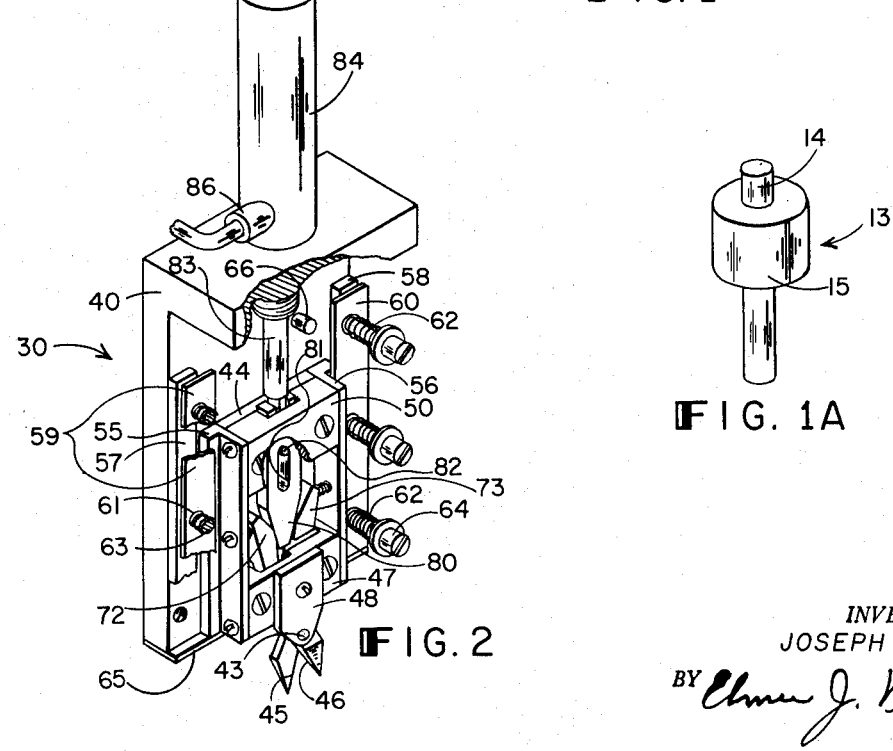
FIG. 2
INVENTOR.
JOSEPH S. CERRA
BY *Elmer J. Nealon*
ATTORNEY.

June 18, 1963 J. S. CERRA 3,094,030
APPARATUS FOR CUTTING FILAMENTARY MATERIALS
Filed March 31, 1960 2 Sheets-Sheet 2

INVENTOR.
JOSEPH S. CERRA
BY
ATTORNEY.

United States Patent Office 3,094,030
Patented June 18, 1963

3,094,030
APPARATUS FOR CUTTING FILAMENTARY
MATERIALS
Joseph S. Cerra, Burlington, Mass., assignor to Sylvania
Electric Products, a corporation of Delaware
Filed Mar. 31, 1960, Ser. No. 18,995
6 Claims. (Cl. 83—555)

This invention relates to apparatus for cutting materials. More particularly, it is concerned with apparatus for automatically cutting filamentary materials wherein the cutting members of the apparatus are advanced into position adjacent the material, cut the material, and then are retracted from adjacent the material.

Many electrical and electronic devices which require filamentary material in wire or strip form in their fabrication are produced on automatic or semiautomatic equipment. The filamentary material is commonly in a continuous coil mounted on a reel from which it is fed to a work station of a piece of equipment. During the period that a device element being fabricated is in position at the work station a length of material is applied to the element and severed from the supply on the reel. In the fabrication of very small device elements, arranging the various items of apparatus which perform operations on the element, including the cutting apparatus, at the work station so that they may perform their functions properly without interfering with each other may be difficult because of their large size relative to the device element. If extremely fine filamentary material is employed, particularly in very short lengths, the problems of spacing and providing adequate clearances between the various items is compounded since cutting apparatus must be provided which will cut the material at a precise point intermediate the feeding apparatus and the device element. It is desirable that the cut be made cleanly with a minimum amount of burr and without altering the position of the material so that the ends of material on either side of the cut are not deflected out of position for subsequent operations.

Therefore, it is an object of the present invention to provide an improved apparatus for cutting filamentary materials.

It is another object of the invention to provide automatic apparatus for cutting filamentary materials which requires little space and does not interfere with other operating apparatus when employed in conjunction with automatic or semiautomatic fabricating equipment.

Briefly, in accordance with the foregoing objects, cutting apparatus according to the invention includes two cutting members having opposed cutting portions adapted for cutting material placed between them. The two cutting portions are separated and advanced into cutting position astraddle the material to be cut in response to the movement of an actuating means in one direction. The two cutting portions are closed upon the material to cut it and then are withdrawn from the cutting position by movement of the actuating means in the opposite direction.

Additional objects, features, and advantages of cutting apparatus according to the invention will be apparent from the following detailed discussion and the accompanying drawings wherein:

FIG. 1 is a schematic representation in plan view of semiautomatic equipment for providing a short, shaped length of wire at the end of a pin assembly, which equipment employs cutting apparatus according to the invention for severing the length of wire from the supply of wire after it has been attached to the pin assembly;

FIG. 1A is a perspective view of a pin assembly which is provided with a shaped length of wire in the equipment of FIG. 1;

FIG. 2 is a perspective view in elevation of cutting apparatus according to the invention as employed in the equipment of FIG. 1 shown with portions removed and with the cutting members open and in the advanced position preparatory to cutting;

Figure 3:
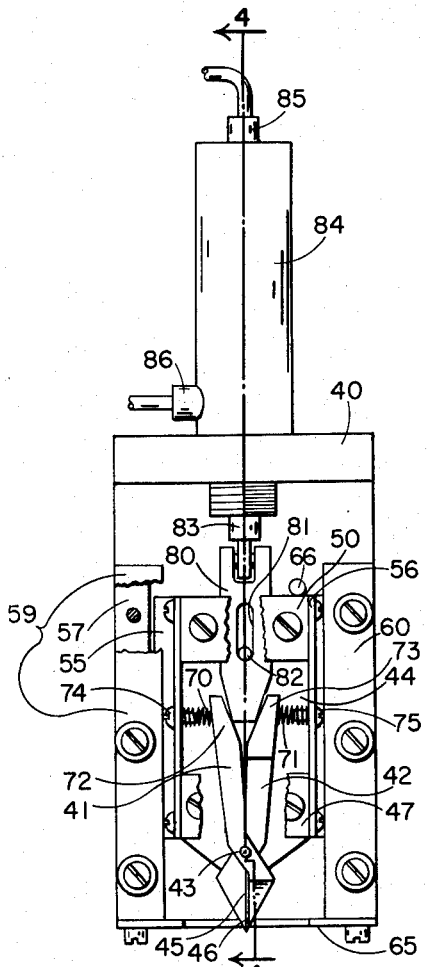
FIG. 3 is a front elevational view of the cutting apparatus of FIG. 2 shown with portions removed and with the cutting members closed and in the retracted position.

In order to present the details of the invention so as to provide an understanding of its full significance and possibilities, cutting apparatus according to the invention is described in conjunction with the equipment shown schematically in FIG. 1 for applying a length of shaped wire to the end of the pin assembly shown in FIG. 1A. The equipment includes a rotary table 10 set in the surface of the bench 11. The table is indexed periodically through an angle of 90° by suitable driving mechanism (not shown). Four holders 12 for holding pin assemblies 13 are equally spaced around the periphery of the rotary table. Each pin assembly, shown enlarged in FIG. 1A, includes a metal pin 14 mounted concentrically within a bead 15 of insulating material. A pin assembly is placed in a holder while the holder is located at the loading position 20. At the second index of the table after a pin assembly has been loaded into a holder that pin assembly is in position at the work station 21.

Located near the work station is a reel 22 containing a supply of fine wire 24 and a feeding mechanism 23 for placing the end of the wire adjacent the outer end of the pin. The feeding mechanism engages the wire and is advanced toward the pin assembly carrying the wire with it. The feeding mechanism as well as the other items of apparatus located at the work station are actuated at the proper time in the operating cycle by a suitably sequenced driving apparatus (not shown). After the feeding mechanism has moved the end of the wire into position adjacent the end of the pin, a welding electrode 25 is moved forward forcing the wire against the end of the pin. Electrical current is applied to the welding electrode to weld the end of the wire to the end of the pin. The welding electrode is then returned to its original position and the feeding mechanism is also retracted while slipping with respect to the attached wire.

Also located at the work station is a cutting apparatus 30 for severing a length of the wire from the supply on the reel after the end has been welded to the pin. The cutting apparatus is mounted on a bracket 31 so as to be supported in position above the wire and clear of the feeding mechanism when the feeding mechanism is in the advanced position. After the feeding mechanism has been fully retracted, the cutting blades of the cutting apparatus are moved downward into position, cut the wire at the proper point between the pin and the feeding mechanism, and are withdrawn out of the way. As the cutting blades are retracted, forming tools 32 and 33 are advanced inward and engage the length of wire between them, forming the wire into the desired shape. Then, the forming tools are retracted. After these operations have been performed on the pin assembly and the wire attached to it at the work station, the rotary table indexes and transfers the completed element to the next position. On the subsequent index the completed element is moved to the position 20 at which it was loaded into the holder, and is there removed from the holder and replaced with another pin assembly.

Figure 4:
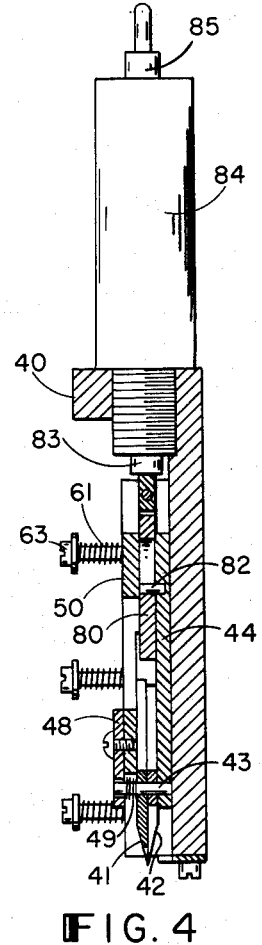
FIG. 4 is a side elevational view of cutting apparatus according to the invention shown in cross-section taken along the line 4—4 of FIG. 3 but including the portions removed in FIG. 3.

Details of the cutting apparatus employed in conjunction with the equipment of FIG. 1 together with its manner of operation may best be understood from the perspective view of FIG. 2 together with the elevational views of FIGS. 3 and 4. The apparatus includes a base member or body 40 which may be fastened to a support or bracket 31 as shown in FIG. 1 in order to locate the apparatus with respect to the equipment with which it is associated. Other parts of the apparatus are attached to or are movably mounted on the body. Two cutting members 41 and 42 pivot about a pin 43 attached to a mounting plate or support 44 so as to provide shearing action at their cutting edges 45 and 46. The support is movably mounted on the body 40 as will be subsequently explained, and movement of the support carries the cutting members into and out of cutting position. The cutting members are held to the support while remaining free to pivot on the pin by a lower bridge 47 fastened to the support and a retaining plate 48 fastened to the bridge. The retaining plate surrounds the pivot pin and holds a compression spring 49 encircling the pin in place. The action of the compression spring on the cutting members forces them against each other so that their cutting edges mate to provide proper shear action upon closing of the cutting edges. An upper bridge 50, the purpose of which will be explained hereinbelow, is also attached to the support 44.

Slides or runners 55 and 56 which provide sliding contact between the support 44 and the surface of the body 40 are attached on each side of the support by being directly fastened to the bridges. Guides 57 and 58 attached to the body define the channel along which the support and the elements attached thereto may move with respect to the body. Friction plates 59 and 60 are biased toward the body by two sets of compression springs 61 and 62 thus tending to clamp the slides between the friction plates and the body. The friction plate springs are held in position so as to bear against the friction plates by two sets of bolts 63 and 64 which pass through holes in the friction plates and are fastened to the body. The slides are clamped between the body and friction plates with sufficient force to prevent movement of the support relative to the body unless the amount of force applied to move the support exceeds a certain minimum as will be explained hereinbelow. Movement of the support in the direction of advancement is limited by a stop plate 65 against which the support strikes, and movement in the direction of retraction is limited by a stop pin 66.

The cutting edges of the cutting members are biased closed by two compression springs 70 and 71 acting on the arms 72 and 73 of the cutting members and bearing against the inner walls of the slides. These compression or cutting springs are held in position by bolts 74 and 75 fastened to the slides. The inner surfaces of the cutting member arms are tapered in order to receive a cam element or wedge 80 which is slidably mounted between the support and the upper bridge 50. Movement of the wedge in one direction with respect to the support separates the cutting member arms against the force of the cutting springs and opens the cutting edges. Movement of the wedge in the opposite direction permits the springs to move the arms toward each other and close the cutting edges. The amount of movement of the wedge with respect to the support is a fixed distance determined by the length of a slot 81 in the wedge through which extends a guide pin 82 fixed to the support. The slot and pin connection thus provides lost motion coupling between the wedge and the support. The end of the wedge removed from the cutting members is pinned in a clevis arrangement to the piston 83 of a double acting air cylinder 84 which is mounted firmly to the body 40. The piston is moved downward by air under pressure admitted to the cylinder at the upper inlet 85, and is forced upward by air admitted at the lower inlet 86. A solenoid valve 87 as shown in FIG. 1 is employed to apply air to the appropriate inlet in response to electrical signals.

The apparatus as described hereinabove operates in the following manner in order to cut wire or other filamentary material. With the piston 83 of the cylinder in the retracted or upward position as shown in FIGS. 3 and 4, the support 44 is also fully retracted and abuts the stop pin 66, the bottom of the slot 81 in the wedge contacts the guide pin 82, and the cutting springs 70 and 71 hold the cutting members closed. When the solenoid 87 is actuated during an operating cycle by electrical signals from the sequenced driving apparatus (not shown), air is forced into the air cylinder through the upper inlet 85 thus moving the piston and the attached wedge downward. The springs 61 and 62 acting on the friction plates 59 and 60 clamp the slides 55 and 56 against the body 40 with sufficient force so that the support 44 does not move downward as the wedge starts to move. Instead the wedge moves with respect to the support forcing the arms of the cutting members apart against the action of the cutting springs and opening the cutting edges. When the wedge has been moved downward the distance of the length of the slot 81 and the guide pin 82 is engaged by the portion of the wedge at the top of the slot, the cutting edges are fully opened. Additional downward movement of the piston and wedge acting through the guide pin overcomes the friction caused by the friction plate springs and advances the support together with the open cutting members until the support strikes the stop plate 65 as shown in FIG. 2.

After the cutting members have been advanced into the cutting position as shown in FIG. 2 with the cutting edges open and straddling the wire to be cut, the solenoid 87 is activated by the mechanism at the rotary table to switch the air under pressure from the upper inlet 85 of the cylinder to the lower inlet 86. As the piston 83 pulls the wedge 80 upward, the clamping effect of the friction plates on the slides tends to prevent the movement of the support 44, and the wedge is thus pulled upward relative to the support. As the wedge is removed from between the tapered inner surfaces of the arms of the cutting members, the cutting springs 70 and 71 force the arms toward each other and close the cutting edges cutting the wire. After the wedge has been moved to a position such that the guide pin 82 is at the bottom of the slot 81, additional movement of the wedge acting on the guide pin retracts the support and cutting members from the cutting position until the support strikes the stop pin 66.

Thus, apparatus for cutting filamentary material is provided in which the cutting members are advanced into operating position, employed to cut the material, and then retracted from the operating position. The apparatus occupies a minimum of space in the region adjacent the device element being fabricated and causes a minimum of interference with other operating apparatus. The cutting apparatus is completely self-contained and may be remotely controlled by an any of various types of activating mechanisms. Because of its self-contained features the apparatus may be oriented at any attitude, readily adjusted to cut at the proper point along the wire, and employed in conjunction with widely differing forms of equipment. Cutting the wire by the action of shearing between two cutting members which are themselves moved into cutting position does not require that the wire be moved against a cutting or chopping block, and thus the end is positioned to be advanced directly against the next pin assemby without the need for additional wire guiding or other ancillary positioning means.

There are also additional advantageous features incorporated in the cutting apparatus as disclosed. The cutting members may be constructed so that the cutting edges are parallel to each other at the instant the wire is contacted by both edges thus preventing the wire from slipping along the cutting edges as it is being cut. The cutting members are readily demounted from the apparatus for sharpening or replacing. Although cutting apparatus according to the invention has been shown and described in conjunction with particular wire attaching and forming equipment, its use in countless other applications wherein it is desired to cut filamentary materials is readily apparent.

What is claimed is:
1. Apparatus for cutting filamentary material including two cutting members having mating cutting portions, a support for said cutting members, said members being pivotally mounted on said support, spring means mounted on said support tending to bias said cutting portions together, a cam element movably mounted on said support for separating said cutting portions in opposition to said spring means upon movement of the cam element in one direction with respect to said support and for permitting said spring means to close said cutting portions upon movement of the cam element in the opposite direction with respect to said support, reciprocating means for moving said cam element in the one direction with respect to said support and for advancing said support in the one direction, and also for moving said cam element in the opposite direction with respect to said support and for moving said support in the opposite direction, and support restraining means adapted to prevent advancement of the support in the one direction by the reciprocating means until the reciprocating means has moved the cam element a predetermined distance in the one direction with respect to the support, and also adapted to prevent movement of the support in the opposite direction by the reciprocating means until the reciprocating means has moved the cam element said predetermined distance in the opposite direction with respect to the support.

2. Apparatus for transversely cutting filamentary material which comprises a base member, a cutting means supported for reciprocal movement along a surface of said base member, and reciprocating actuating means for moving said cutting means in a direction of advancement with respect to said base member and for moving said cutting means in a direction of retraction with respect to said base member; said cutting means including a pair of relatively movable cutting members having mating cutting portions, a support for said members, and cutter driving means for bringing said cutting portions into cutting engagement; said actuating means including a connection means for providing lost motion coupling to the support whereby movement of the actuating means through a distance in the direction of advancement advances the support a distance less than said distance in the direction of advancement by a fixed amount of lost motion distance and whereby movement of the actuating means through a distance in the direction of retraction retracts the support a distance less than said distance in the direction of retraction by said fixed amount of lost motion distance, a portion of said connection means being adapted for separating said cutting portions from cutting engagement in opposition to said cutter driving means upon movement of the actuating means relative to the support through the fixed amount of distance in the direction of advance, and for permitting said cutter driving means to bring said cutting portions into cutting engagement upon movement of the actuating means relative to the support through the fixed amount of distance in the direction of retraction; said base member including means for retaining said cutting means in slidable relation against said surface of said base member and for preventing movement of said cutting means in the direction of advancement with respect to said base member by the actuating means until the actuating means has moved relative to the support through the fixed amount of distance in the direction of advancement, and also for preventing movement of the said cutting means in the direction of retraction with respect to said base member by the actuating means until the actuating means has moved relative to the support through the fixed amount of distance in the direction of retraction.

3. Apparatus for transversely cutting filamentary material which comprises a base member, a cutting means supported for reciprocal movement along a surface of said base member, and reciprocating actuating means for moving said cutting means in a direction of advancement with respect to said base member and for moving said cutting means in a direction of retraction with respect to said base member; said cutting means including a pair of cutting members having mating cutting edges and arm portions, a support for said members, said members being pivotally mounted intermediate the cutting edges and arm portions of the members at a common point on said support whereby movement of the arm portions toward each other closes said cutting edges, and cutting springs acting against said support and biasing said arm portions toward each other; said actuating means including a wedge having a slot therein extending along the direction of advancement and retraction, said slot mating with a portion of said support protruding into the slot whereby said wedge moves a fixed distance relative to the support in the direction of advancement and also advances the cutting means relative to the base member upon movement of the actuating means in the direction of advancement a distance greater than said fixed distance and whereby said wedge moves the same fixed distance relative to the support in the direction of retraction and also retracts the cutting means relative to the base member upon movement of the actuating means in the direction of retraction a distance greater than said fixed distance, said wedge lying interposed between and bearing against the arm portions of the cutting members whereby the movement of the wedge relative to the support in the direction of advancement separates said arm portions in opposition to said cutting springs and opens said cutting edges and whereby the movement of the wedge relative to the support in the direction of retraction permits said cutting springs to force said arm portions toward each other and close said cutting edges; said base member including friction means for retaining said cutting means in slidable relation against said surface of said base member and for preventing movement of said support in either direction with respect to the base member until the actuating means has moved said fixed distance in that direction.

4. Apparatus for cutting filamentary material including two cutting members having mating cutting portions, a body, a support for said cutting members movable with respect to said body, said members being pivotally mounted on said support, spring means acting on said cutting members biasing said cutting portions together, a cam element movably mounted on said support and having a limited amount of movement with respect to the support in one direction and in the opposite direction whereby movement of the cam element in either direction in excess of the limited amount of movement also moves the support with respect to the body, said cam element having a portion interposed between said cutting members whereby movement of the cam element in the one direction with respect to the support separates said cutting portions in opposition to said spring means and movement of the cam element in the other direction with respect to said support permits said spring means to close said cutting portions, reciprocating means for moving said cam element in the one direction a distance greater than said limited amount of movement and in the opposite direction a distance greater than said limited amount of movement, and friction means for preventing movement of said support in either direction with respect to said body until said cam element has been moved a distance greater than said limited amount of movement in that direction.

5. Apparatus for cutting filamentary material including two cutting members having mating cutting edges, a body, a support for said cutting members movable with respect to said body, said members being pivotally mounted on said support, spring means acting on said cutting members biasing said cutting edges together, a wedge movably mounted on said support, cooperating means on said wedge and said support for preventing movement of the wedge in one direction beyond a first position with respect to the support and for preventing movement of the wedge in the opposite direction beyond a second position with respect to the support at a fixed distance from said first position, said wedge having a tapered portion interposed between said cutting members whereby movement of the wedge to said first position opens said cutting edges in opposition to said spring means and movement of the wedge to said second position permits said spring means to close said cutting edges, reciprocating means for moving said wedge in the one direction a distance greater than said fixed distance and for moving said wedge in the opposite direction a distance greater than said fixed distance, and spring loaded friction means holding the support against the body for preventing the reciprocating means from moving said support in the one direction until said wedge is at said first position and for preventing said reciprocating means from moving said support in the opposite direction until said wedge is at said second position.

6. Apparatus for cutting filamentary material including two cutting members having arm portions and having two opposed cutting edges, a body, a support for said cutting members movable with respect to said body, said cutting members being pivotally mounted intermediate the cutting edges and arm portions at a point on said support whereby movement of the arm portions toward each other closes said opposed cutting edges to cut filamentary material placed therebetween, cutting springs supported on said support and biasing said arm portions toward each other, a wedge movably mounted on said support, said wedge having a slot therein, a pin fixed to said support and extending into said slot so that movement of the wedge with respect to the support is limited to a fixed distance along the length of the support, said wedge having its tapered surfaces interposed between the arm portions of said cutting members whereby movement of the wedge in one direction with respect to the support opens said arm portions and said cutting edges in opposition to said springs and movement of the wedge in the opposite direction with respect to said support permits said springs to close said arm portions and said cutting edges, reciprocating means for moving said wedge a distance greater than said fixed distance with respect to the body in the one direction and in the opposite direction, and spring loaded friction plate means for biasing the support against said body whereby movement of the support with respect to the body is prevented until the wedge has been moved through the fixed distance so that an extremity of said slot bears against said pin.

References Cited in the file of this patent

UNITED STATES PATENTS

| | | |
|---|---|---|
| 332,525 | Hill | Dec. 15, 1886 |
| 348,000 | Eastman | Aug. 24, 1886 |
| 613,700 | Mathews | Nov. 8, 1898 |
| 1,379,720 | Paulman | May 31, 1921 |
| 1,397,133 | Macbeth | Nov. 15, 1921 |
| 1,678,080 | Renz | July 24, 1928 |
| 2,570,696 | Levine | Oct. 9, 1951 |
| 2,603,255 | Woolery | July 15, 1952 |

FOREIGN PATENTS

| | | |
|---|---|---|
| 642,561 | Great Britain | Sept. 6, 1950 |

OTHER REFERENCES

Germany, Sch 16,882 VII/71c, Oct. 25, 1956.